US011910736B2

(12) United States Patent
Carmen et al.

(10) Patent No.: US 11,910,736 B2
(45) Date of Patent: Feb. 27, 2024

(54) ELECTRIC POWER LAWN AERATOR (71) Applicant: Bluebird Turf Products LLLP, Auburn Hills, MI (US)

(72) Inventors: Anthony Joseph Carmen, Bloomfield Hills, MI (US); Nicholas Anthony Salvatore, Shelby Township, MI (US)

(73) Assignee: Bluebird Turf Products LLLP, Auburn Hills, MI (US)

( * ) Notice: Subject to any disclaimer, the term of this patent is extended or adjusted under 35 U.S.C. 154(b) by 593 days.

(21) Appl. No.: 17/076,155

(22) Filed: Oct. 21, 2020

(65) Prior Publication Data
US 2021/0112696 A1 Apr. 22, 2021

Related U.S. Application Data (60) Provisional application No. 62/923,991, filed on Oct. 21, 2019.

(51) Int. Cl.
*A01B 45/02* (2006.01)
(52) U.S. Cl.
CPC .................... *A01B 45/02* (2013.01)
(58) Field of Classification Search
CPC ....... A01B 45/00; A01B 45/02; A01B 45/023; A01B 45/026
See application file for complete search history.

(56) References Cited

U.S. PATENT DOCUMENTS

| 5,119,880 | A  | * | 6/1992 | Zehrung, Jr. | A01B 45/026 172/43 |
| 5,203,147 | A  | * | 4/1993 | Long | H01H 9/06 56/10.1 |
| 5,988,290 | A  | * | 11/1999 | Banks | A01B 45/023 172/101 |
| 6,523,334 | B1 | * | 2/2003 | Dettmann | A01D 34/58 56/11.9 |
| 6,571,542 | B1 | * | 6/2003 | Fillman | B60L 50/66 56/10.2 A |
| 7,677,017 | B2 | * | 3/2010 | Holby | A01D 34/47 56/10.6 |
| 8,733,072 | B2 | * | 5/2014 | Hansen | B60T 7/14 56/10.8 |
| 10,130,024 | B2 |   | 11/2018 | Lapp | |
| 11,241,954 | B2 | * | 2/2022 | Paulides | B60K 17/28 |
| 2002/0095922 | A1 | * | 7/2002 | Goman | A01D 34/62 56/294 |
| 2006/0288680 | A1 | * | 12/2006 | Holby | A01D 34/47 56/11.9 |

(Continued)

*Primary Examiner* — Jamie L McGowan
(74) *Attorney, Agent, or Firm* — REISING ETHINGTON, P.C.

(57) ABSTRACT

An electric power lawn aerator is employed in use to care for lawns. The electric power lawn aerator is battery-powered, and includes a frame assembly, one or more non-driven wheels, a handle assembly, a powerhead assembly, a powertrain assembly, and a tine assembly, among other possible components. The powerhead assembly has one or more battery cavities and an electric motor. A battery, such as a lithium-ion battery, is received in the battery cavity(s) and powers the electric motor. The electric motor imparts rotational drive to the tine assembly by way of the powertrain assembly. The tine assembly punctures the lawn amid use of the electric power lawn aerator.

11 Claims, 6 Drawing Sheets

(56) References Cited

U.S. PATENT DOCUMENTS

| | | | |
|---|---|---|---|
| 2008/0021609 A1* | 1/2008 | Derby | A01D 34/824 |
| | | | 701/36 |
| 2008/0245046 A1* | 10/2008 | Witty | A01D 34/53 |
| | | | 56/249 |
| 2015/0216103 A1* | 8/2015 | Barnett | A01B 45/026 |
| | | | 172/21 |
| 2015/0225027 A1* | 8/2015 | Ertel | F16D 11/14 |
| | | | 180/53.7 |
| 2018/0352736 A1* | 12/2018 | Kulkarni | A01D 34/58 |
| 2019/0160972 A1* | 5/2019 | Zeiler | B60L 50/66 |
| 2020/0146213 A1* | 5/2020 | Goman | A01D 34/47 |
| 2020/0267883 A1* | 8/2020 | Harvey | A01B 75/00 |
| 2021/0112696 A1* | 4/2021 | Carmen | A01B 45/026 |

\* cited by examiner

ELECTRIC POWER LAWN AERATOR

CROSS-REFERENCE TO RELATED APPLICATION

This application claims the benefit of U.S. Provisional Patent Application No. 62/923,991, filed Oct. 21, 2019.

INTRODUCTION

The present disclosure generally relates to lawn care equipment and, more particularly, relates to power lawn aerators used to perforate soil of lawns in yards, gardens, parks, and other areas.

Soil that is too heavily compacted can lack proper circulation of air, water, and nutrients. Grass roots can be harmed as a consequence. Standard lawn care maintenance and regimes ordinarily call for aerating soil to alleviate such compacted conditions. Aeration typically involves perforating soil with small holes in order to allow infiltration of air, water, and nutrients to grass roots. Lawn aerators are equipment used to perform this task. Past power lawn aerators are commonly powered by gasoline engines.

SUMMARY

In an embodiment, an electric power lawn aerator may include a frame assembly, one or more non-driven wheels, a handle assembly, a powerhead assembly, a powertrain assembly, a driven wheel, and a tine assembly. The non-driven wheel(s) extends from the frame assembly. The handle assembly extends from the frame assembly. The powerhead assembly is supported on the frame assembly. The powerhead assembly has one or more battery cavities that receive one or more batteries. The powerhead assembly has an electric motor that can be powered by the battery(s). The electric motor has a shaft. The powertrain assembly receives rotational drive input from the electric motor's shaft upon activation of the electric motor. The powertrain assembly includes a pulley assembly and a sprocket assembly. The pulley assembly includes multiple pulley wheels, and the sprocket assembly includes multiple sprockets. The driven wheel extends from the frame assembly and receives rotational drive input from the powertrain assembly. The tine assembly is housed by the frame assembly and receives rotational drive input from the powertrain assembly.

In an embodiment, an electric power lawn aerator may include a frame assembly, one or more non-driven wheels, a handle assembly, a bail control bar, a powerhead assembly, a main switch, a powertrain assembly, and a tine assembly. The non-driven wheel(s) is situated at the frame assembly. The handle assembly extends from the frame assembly. The bail control bar is situated at the handle assembly. The powerhead assembly is supported on the frame assembly, and includes a housing, one or more battery cavities, and an electric motor. The battery cavity(s) is housed in the housing, and the electric motor is housed in the housing. The electric motor has a shaft. The main switch is disposed near or at the powerhead assembly. The powertrain assembly receives rotational drive input from the electric motor's shaft when the electric motor is activated. The tine assembly is housed by the frame assembly, and receives rotational drive input from the powertrain assembly. In order to activate the electric motor and impart rotational drive to the powertrain assembly and to the tine assembly, the main switch is actuated and the bail control bar is brought to a pulled position.

In an embodiment, an electric power lawn aerator may include a frame assembly, one or more non-driven wheels, a handle assembly, a bail control bar, a powerhead assembly, one or more batteries, a main switch, an electronic control unit, a powertrain assembly, a driven wheel, and a tine assembly. The non-driven wheel(s) is situated at the frame assembly. The handle assembly extends from the frame assembly. The bail control bar is situated at the handle assembly. The powerhead assembly is supported on the frame assembly, and includes a housing, one or more battery cavities, and an electric motor. The battery cavity(s) is housed in the housing, and the electric motor is housed in the housing. The electric motor has a shaft. The battery(s) is received in the battery cavity(s). The main switch is disposed on the housing's exterior. The electronic control unit has electrical communication with the electric motor, and has electrical communication with the main switch. The powertrain assembly receives rotational drive input from the electric motor's shaft when the electric motor is activated. The driven wheel is situated at the frame assembly, and receives rotational drive input from the powertrain assembly. The tine assembly is housed by the frame assembly, and receives rotational drive input from the powertrain assembly.

BRIEF DESCRIPTION OF THE DRAWINGS

One or more aspects of the disclosure will hereinafter be described in conjunction with the appended drawings, wherein like designations denote like elements, and wherein.

DETAILED DESCRIPTION

Referring to the drawings, an embodiment of an electric power lawn aerator 10 is presented in the figures and detailed in this description. The electric power lawn aerator 10 is of the walk-behind type, and is employed in use to perforate and puncture soil with small holes in grass lawns for yards, gardens, parks, and other areas including private and public areas, as well as residential and commercial areas. Compared to past gasoline-powered power lawn aerators with gasoline engines, the electric power lawn aerator 10 is battery-powered and has a significant reduction in noise, vibration, and harshness (NVH). Diminished vibration at the electric power lawn aerator's handle means that an operator can physically operate the electric power lawn aerator 10 for a longer period of time. And diminished noise emitted by the electric power lawn aerator 10 means that it can be operated at times that would otherwise be prohibitive by local ordinances or off-limits in other respects such as during early morning hours. Since it is battery-powered, the electric power lawn aerator 10 is cordless. The electric power lawn aerator 10 is also lighter in weight and better for the environment than the gasoline-powered power lawn aerators of the past.

The electric power lawn aerator 10 can have various designs, constructions, and components in different embodiments depending upon—among other possible factors—the size of the electric power lawn aerator. In an embodiment of FIGS. 1-6, for example, the electric power lawn aerator 10 has, as some of its main components, a frame assembly 12, non-driven wheels 14, a handle assembly 16, a powerhead assembly 18, a powertrain assembly 20, a driven wheel 22, and a tine assembly 24; still, the electric power lawn aerator could have more, less, and/or different components in other embodiments. The frame assembly 12 houses certain components of the electric power lawn aerator 10 and supports others, and serves as a main body of the electric power lawn aerator 10. At an underside the frame assembly 12 houses the powertrain assembly 20 and the tine assembly 24, and at an exterior the frame assembly 12 supports the non-driven wheels 14, the handle assembly 16, and the powerhead assembly 18. The frame assembly 12 is an assemblage of metal walls: a first sidewall 26, a second sidewall 28, and a top wall 30, among other walls. The walls of the deck housing 12 establish an interior 32 with an open bottom. The non-driven wheels 14, two in total, are situated at a rear of the frame assembly 12 and provide rolling traversal of the electric power lawn aerator 10 over an underlying ground surface G (FIG. 3). Axles can be mounted to the frame assembly 12, or extend therefrom, for support of spinning of the non-driven wheels 14.

The handle assembly 16 extends from the frame assembly 12 and can be grasped by the operator amid use of the electric power lawn aerator 10. The handle assembly 16 has a pair of side arms 34 mounted at their proximal ends to the frame assembly 12. A handlebar 36 extends between the side arms 34 and has a pair of handles 38. To prompt rotation of the tine assembly 24, a bail control bar 40 and a bail cable 42 are provided at the handle assembly 16. The bail control bar 40 is pivotably connected to the side arms 34 and can be moved by the operator from a released position, as presented in the figures, to a pulled position as represented in FIGS. 2 and 3 by the broken-line depiction of the bail control bar 40. Bringing the bail control bar 40 to the pulled position displaces the bail control bar 40 to have abutment or near abutment with the handlebar 36. The bail control bar 40 can be spring-biased to the released position. The bail cable 42 spans between the bail control bar 40 and an idler pulley wheel (described below) of the powertrain assembly 20. The bail cable 42 is connected at one end to the bail control bar 40, and is connected at its other, opposite end to the idler pulley wheel. Pulling the bail control bar 40 to its pulled position concurrently pulls the bail cable 42, and in turn causes movement of the idler pulley wheel. Furthermore, a speed controller 44 is situated at the handle assembly 16, and is particularly mounted to one of the side arms 34. The speed controller 44 is manipulated by the operator to manage the speed of spinning rotation of an electric motor (described below), and can have distinct speed settings. The speed controller 44 can electrically communicate with an electronic control unit (described below) of the electric power lawn aerator 10 via wiring and circuitry. A shifter 46 can be used to set the speed controller 44 in its different speed settings.

The powerhead assembly 18 serves as a battery holder for the electric power lawn aerator 10, and provides rotational drive power to downstream components of the electric power lawn aerator 10. In the embodiment of the figures, the powerhead assembly 18 includes a housing 48, a first battery cavity 50, a second battery cavity 52, and an electric motor 54. The housing 48 houses the first and second battery cavities 50, 52 and houses the electric motor 54. The housing 48 can be composed of a plastic material, and is made-up structurally of a number of walls. In the embodiment of the figures, and with particular reference to FIGS. 1-3 and 6, the housing 48 is seated on the top wall 30 of the frame assembly 12. The housing 48 is segmented into an upper section 56 and a lower section 58. The first and second battery cavities 50, 52 reside at the upper section 56, and the electric motor 54 resides at the lower section 58. The upper section 56 houses batteries (described below) of the electric power lawn aerator 10, and the lower section 58, on the other hand, houses the electric motor 54. The upper section 56 is situated vertically above the lower section 58, and the lower section 58 spans more immediately from the frame assembly 12 and from the top wall 30. The arrangement locates the batteries vertically above the electric motor 54. Together, the upper and lower sections 56, 58 constitute a vertically-stacked configuration of the batteries relative to the electric motor 54. The vertically-stacked configuration has been found to facilitate packaging among the components of battery reception and the electric motor 54, and facilitates the establishment of electrical communication thereamong.

Figure 6:
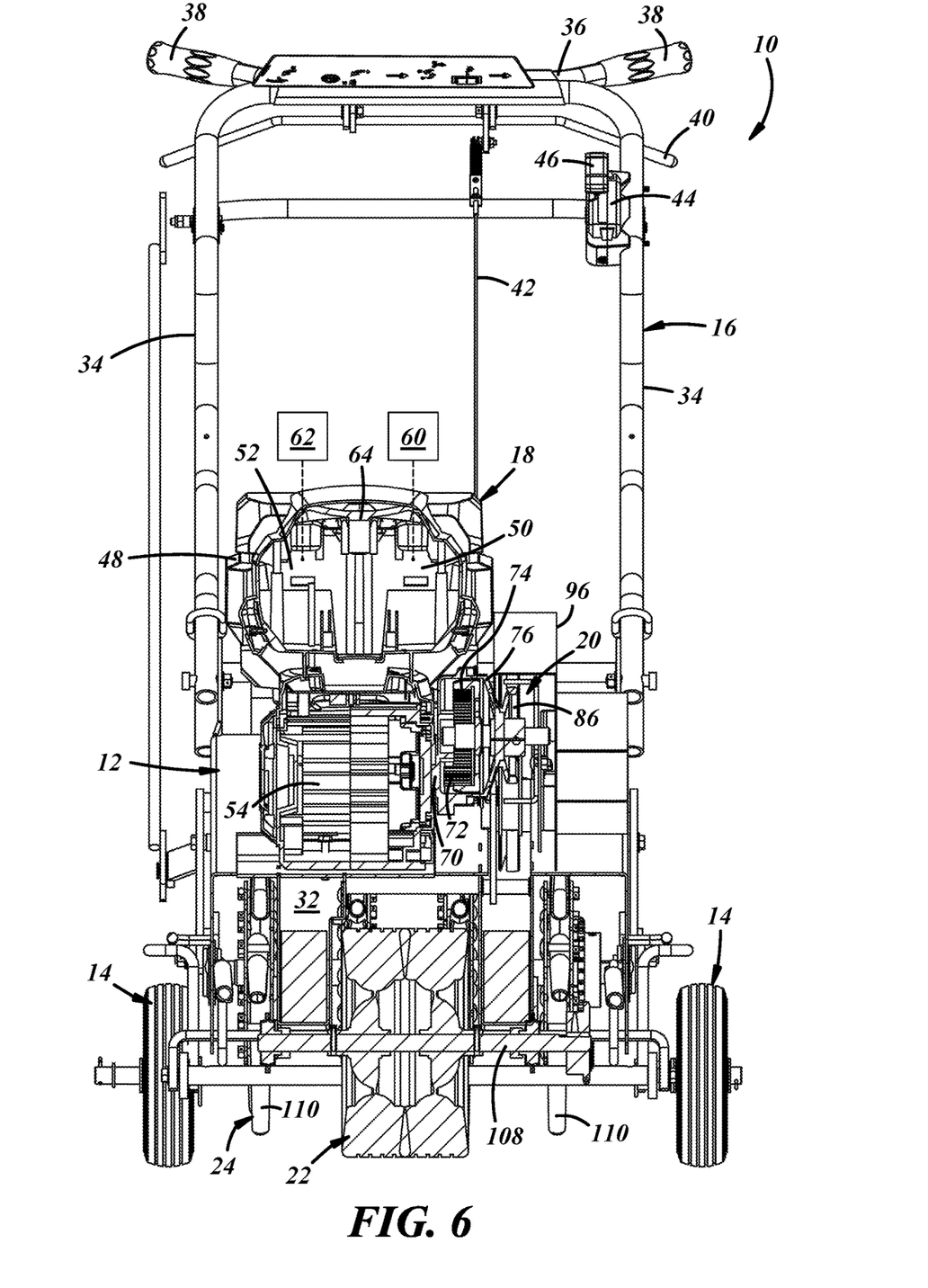
FIG. 6 is a sectional view of the electric power lawn aerator taken at arrowed lines 6-6 in FIG. 2.

Referring now particularly to FIG. 6, the first battery cavity 50 receives insertion of a first battery 60, and the second battery cavity 52 likewise receives insertion of a second battery 62. Still, in other embodiments there could be a single battery cavity and a single battery in the electric power lawn aerator. The first and second battery cavities 50, 52 are wholly enclosed by the housing 48 and reside at the housing's interior. A top cover 64 can be hinged on the housing's body and can be opened for access to the first and second cavities 50, 52 and for inserting and removing the first and second batteries 60, 62. Once the top cover 64 is closed, as depicted in the figures, the first and second battery cavities 50, 52 and first and second batteries 60, 62 are protected against the external environment. The first and second battery cavities 50, 52 have battery receptors to suitably accept power discharge from the first and second batteries 60, 62. Electrical communication can be provided between the first and second battery cavities 50, 52 and first and second batteries 60, 62 and the electric motor 54.

The first and second batteries 60, 62 provide power to the electric motor 54, and can be of various types and can have various specifications in different embodiments. In an example, the first and second batteries 60, 62 are lithium-ion batteries. Here, specifications for a battery pack can include: a rated voltage of 125V d.c., a rated capacity of 2500 mAh, a maximum discharge current of 20 A, and a charging voltage/current of 126V d.c./4 A. Still, other specifications for the battery pack may be suitable. In this example, specifications for a battery cell can include: a rated capacity of 2500 mAh, a charging voltage of up to 4.2V d.c., and a discharging voltage of up to 2.7V d.c. Still, other specifications for the battery cell may be suitable.

Figure 1:
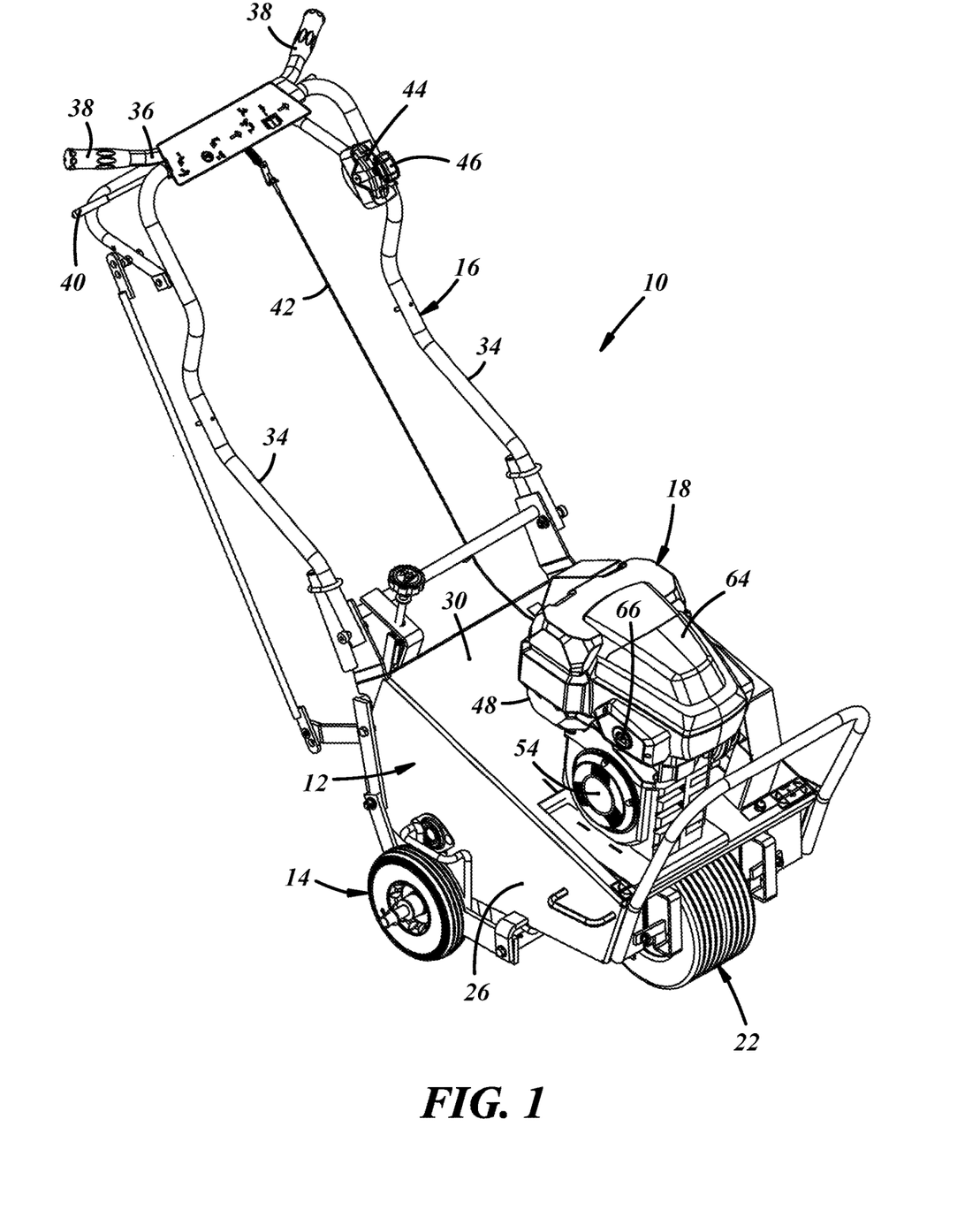
FIG. 1 is a perspective view of an embodiment of an electric power lawn aerator.
Figure 2:
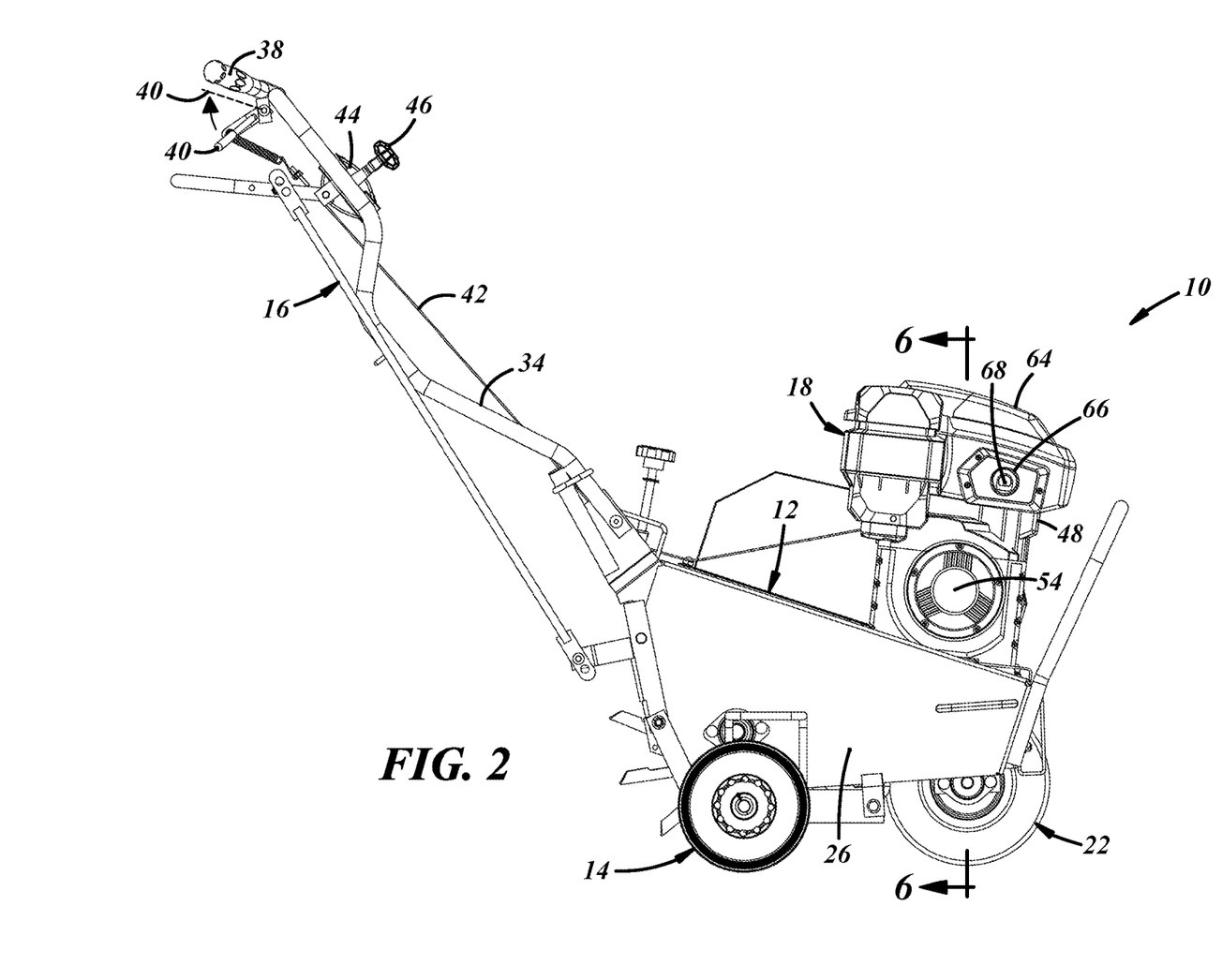
FIG. 2 is a side view of the electric power lawn aerator.
Figure 3:
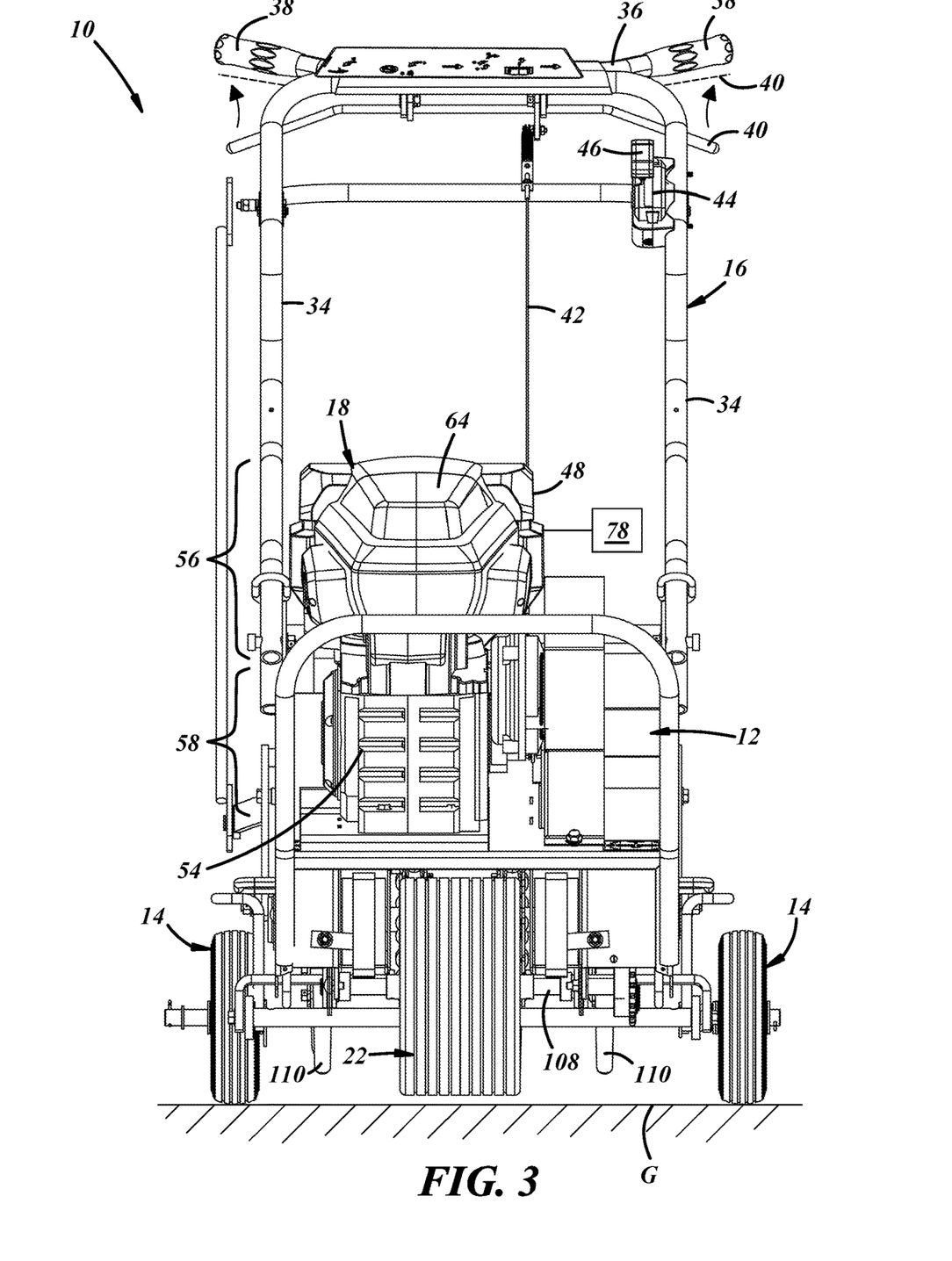
FIG. 3 is front view of the electric power lawn aerator.
Figure 4:
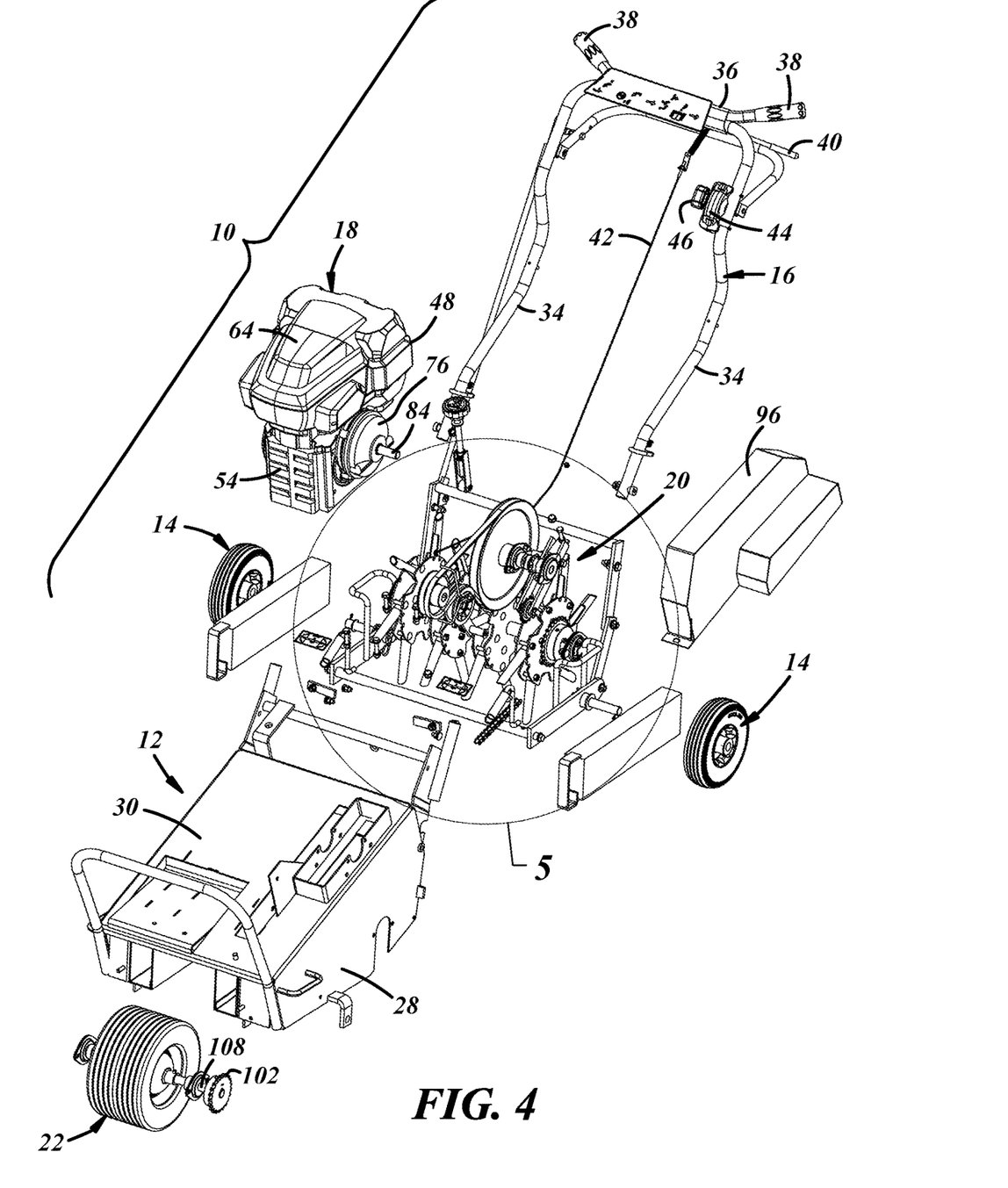
FIG. 4 is an exploded view of the electric power lawn aerator.

With reference now to FIGS. 1 and 2, a main switch 66 is disposed at an exterior of the housing 48 and, in particular, is located on a side of the housing 48 for ready access by the operator. Still, other locations at the exterior of the housing 48 are contemplated in other embodiments, as well as locations elsewhere on the electric power lawn aerator 10. The main switch 66 serves as an ON/OFF switch for the electric power lawn aerator 10. The operator actuates and de-actuates the main switch 66 by physically pressing it. When actuated, the electric motor 54 is ON and activated; and when de-actuated, the electric motor 54 is OFF and deactivated. To protect the main switch 66 and its wiring and circuitry against external liquid and moisture like water, a cover 68 is provided over the main switch 66. The cover 68 fully seals the main switch 66 at all sites of potential exposure. The cover 68 can be flexible and can be composed of a silicone material. In one example the cover 68 achieves a waterproof protection rating of IP65, meaning that water projected by a nozzle against it from any direction has no harmful effects. The location of the main switch 66 at the exterior of the housing 48 has been found to facilitate its electrical communication with the electronic control unit of the electric power lawn aerator 10, and has been found to facilitate its sealing and waterproof protection compared to locations elsewhere on the electric power lawn aerator 10, although locations elsewhere may still be suitable.

The electric motor 54 incites rotational drive and movement of the driven wheel 22 and the tine assembly 24 amid use of the electric power lawn aerator 10. Output torque is transferred from the electric motor 54 and to the driven wheel 22 and tine assembly 24 via the powertrain assembly 20. The electric motor 54 is powered by the first and second batteries 60, 62. In this embodiment, the electric motor 54 is situated on the frame assembly 12 and seated on the top wall 30. The housing 48 houses components of the electric motor 54 including its rotor, stator, windings, and commutator, among other components. Referring now to FIG. 6, a shaft 70 of the electric motor 54 extends therefrom. The shaft 70 spins and rotates when the electric motor 54 is activated and outputs rotational drive and torque to downstream components. In this embodiment, a first gear 72 is mounted on an end of the shaft 70 and has external teeth that exhibit teeth-to-teeth meshing engagement with external teeth of a second gear 74. Rotation of the first gear 72 drives rotation of the second gear 74. The second gear 74 has a larger diameter and circumference than the first gear 72. Together, the first and second gears 72, 74 constitute a gearbox 76. The gearbox 76 is situated immediately downstream of the electric motor's shaft 70 in terms of a path of rotational transmission. The gearbox 76 serves to increase output torque of the electric motor 54 from the first gear 72 and downstream to the second gear 74. Due to the arrangement of the electric motor 54 on the deck assembly 12, the shaft 70 exhibits a horizontal arrangement with respect to the underlying ground surface G. In an example, specifications of the electric motor 54 can include: a voltage of 125V DC, a rated output of 2150 W, a rated speed of 2900 RPM, a rated current of 20 A, and a rated torque of 7.0 N.M. Still, other specifications for the electric motor 54 may be suitable.

An electronic control unit 78 is programmed to manage operation of the electric power lawn aerator 10, including activation and deactivation of the electric motor 54 and speed control of the electric motor 54, among other possible operational functionalities. The electronic control unit 78 is depicted schematically in FIG. 3. In this embodiment, the electronic control unit 78 is housed in the housing 48, but could be located elsewhere in other embodiments. The electronic control unit 78 can have electrical communication via wiring and circuitry with the electric motor 54, with the speed controller 44, with the first and second battery cavities 50, 52, and with the main switch 66. By way of the electrical communications, the electrical control unit 78 receives operational commands and instructions from the speed controller 44 and from the main switch 66, and in turn sends operational commands and instructions to the electric motor 54.

The powertrain assembly 20 transfers rotational drive output and torque output from the powerhead assembly 18 and to the driven wheel 22 and to the tine assembly 24 amid use of the electric power lawn aerator 10. Rotational drive input and torque input is transmitted to the powertrain assembly 20 immediately from the gearbox 76. The powertrain assembly 20 can have various designs, constructions, and components in various embodiments. In the embodiment of the figures, and with particular reference to FIGS. 4-6, the powertrain assembly 20 includes a pulley assembly 80 and a sprocket assembly 82. The pulley assembly 80 receives rotational drive and torque output from a second shaft 84 of the gearbox 76, and imparts rotational drive and torque input to the sprocket assembly 82. The second gear 74 is mounted on the second shaft 84 and drives rotation thereof. A torque increase is effected by the pulley assembly 80 from the gearbox 76 and downstream to the sprocket assembly 82. In this embodiment, the pulley assembly 80 includes a first pulley wheel 86, a second pulley wheel 88, an idler pulley wheel 90, and a belt 92. The pulley wheels 86, 88, 90 are grooved at their outside circumferences for seating of the belt 92. The first pulley wheel 86 is mounted on the second shaft 84 of the gearbox 76 and rotates with the second shaft 84. The second shaft 84 thereby constitutes a common shaft for the second gear 74 and the first pulley wheel 86. The second pulley wheel 88 has a larger diameter and circumference than the first pulley wheel 86. The second pulley wheel 88 is mounted on a third shaft 94 and drives rotation of the third shaft 94. The second pulley wheel 88 is driven to rotate by the first pulley wheel 86 via the belt 92.

The idler pulley wheel 90 engages the belt 92 to draw the belt 92 taut and tight, hence enabling the transfer of rotational drive from the first pulley wheel 86 and to the second pulley wheel 88. The idler pulley wheel 90 has a connection to the bail cable 42 and can be mounted to a plate or an arm of the frame assembly 12 or of the powertrain assembly 20. The idler pulley wheel 90 is movable between two positions. In a first position, the idler pulley wheel 90 is set back from the belt 92 and lacks engagement with the belt 92 or only slightly engages the belt 92. Here, the belt 92 is drawn somewhat loosely around the first and second pulley wheels 86, 88 and is able to slip, and therefore does not transfer rotational drive from the first pulley wheel 86 to the second pulley wheel 88. The idler pulley wheel 90 is spring-biased to the first position and, absent pulling by the bail cable 42, is normally set in the first position. In a second position, the idler pulley wheel 90 is displaced toward the belt 92 and tightly engages the belt 92. Here, any previous looseness or slack is removed from the belt 92, and the belt 92 is tightly drawn around the first and second pulley wheels 86, 88. Rotational drive is transferred via the belt 92 from the first pulley wheel 86 to the second pulley wheel 88 when the idler pulley wheel 90 is in the second position. Movement of the idler pulley wheel 90 to the second position is caused by being pulled by the bail cable 42 when the bail control bar 40 is brought to its pulled position. The belt 92 is endless, can be composed of a rubber material, and is looped around the first and second pulley wheels 86, 88. Furthermore, a cover 96 encloses components of the pulley assembly 80 and sprocket assembly 82 that might otherwise be exposed.

The sprocket assembly 82 receives rotational drive and torque output from the third shaft 94, and imparts rotational drive and torque input to the driven wheel 22 and to the tine assembly 24. A torque increase is effected by the sprocket assembly 82 from the third shaft 94 and downstream to the driven wheel 22 and tine assembly 24. In this embodiment, the sprocket assembly 82 includes a first sprocket 98, a second sprocket 100, a third sprocket 102, and a chain 104. The sprockets 98, 100, 102 have sets of teeth at their outside circumferences for engagement with the chain 104. The first sprocket 98 is mounted on the third shaft 94 and rotates with the third shaft 94. The third shaft 94 hence constitutes a common shaft for the second pulley wheel 88 and the first sprocket 98. The second sprocket 100 has a larger diameter and circumference than the first sprocket 98. The second sprocket 100 is mounted on a tine shaft 106 of the tine assembly 24, and drives rotation of the tine shaft 106. The second sprocket 100 is driven to rotate by the first sprocket 98 via the chain 104. The third sprocket 102 has a larger diameter and circumference than the first sprocket 98. The third sprocket 102 is mounted on an axle 108 of the driven wheel 22, and drives rotation of the axle 108. The third sprocket 102 is driven to rotate by the first sprocket 98 via the chain 104. The chain 104 is endless, can be composed of a metal material, and is looped around the first and second and third sprockets 98, 100, 102.

The driven wheel 22 serves to provide traversal assistance to the operator of the electric power lawn aerator 10 over the underlying ground surface G amid use of the electric power lawn aerator 10. The traversal assistance is in addition to any manual manipulation and/or thrust provided by the operator. The driven wheel 22 is situated at a front of the frame assembly 12 and opposite the non-driven wheels 14. The driven wheel 22 is mounted to the axle 108. When driven to rotate by the powertrain assembly 20, and particularly by the sprocket assembly 82, the driven wheel 22 revolves about the axle 108.

Figure 5:
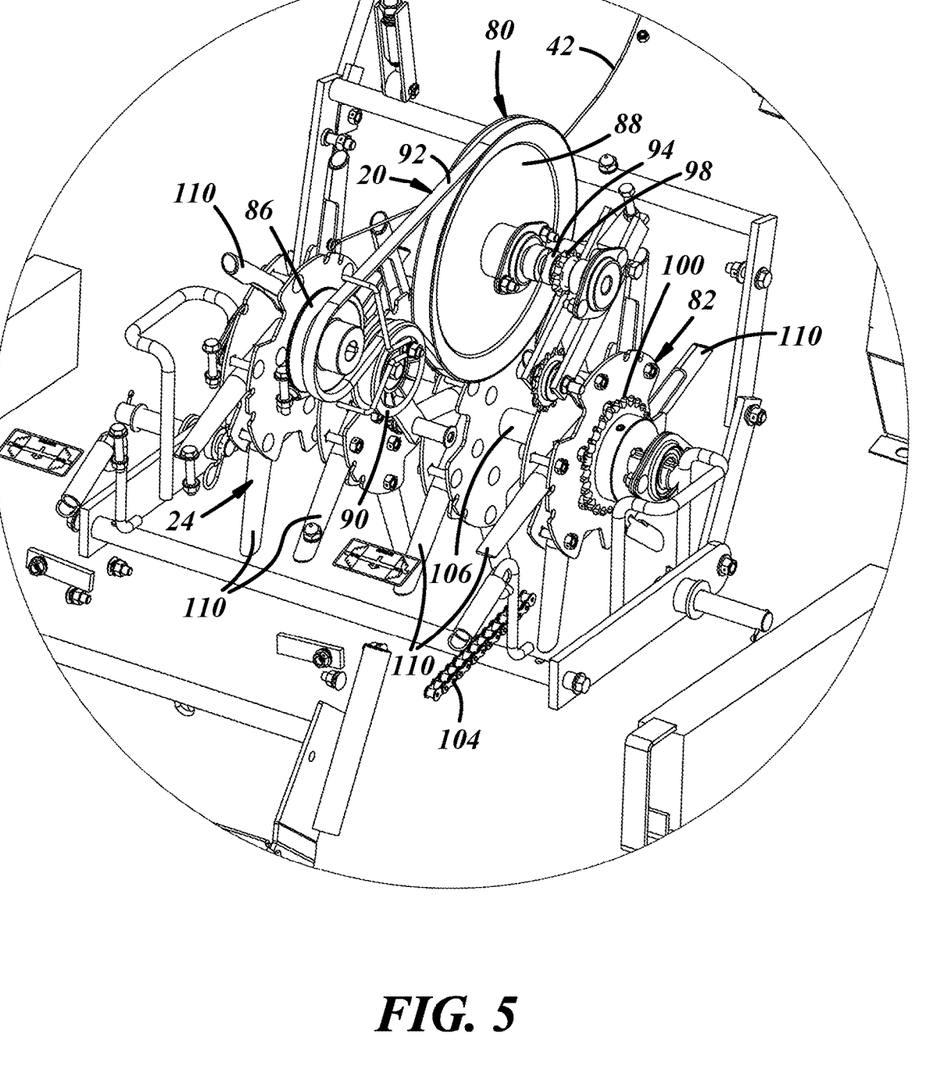
FIG. 5 is an enlarged view of the electric power lawn aerator taken at the encircling numbered 5 in FIG. 4.

The tine assembly 24 serves to perforate and puncture the underlying ground surface G amid use of the electric power lawn aerator 10. The tine assembly 24 is driven to rotate via the powertrain assembly 20. With particular reference to FIG. 5, the tine assembly 24 is housed by the frame assembly 12 and is located at the interior 32. The tine assembly 24 spans across the open bottom of the interior 32 and is mounted to the first sidewall 26 at one of its ends, and is mounted to the second sidewall 28 at its other end. Multiple tines are carried by the tine shaft 106 and are arranged across the longitudinal extent of the tine shaft 106. The tines can take different forms in different embodiments including a solid structure or a hollow structure. In the embodiment of the figures, the tines are in the form of spoons 110. The spoons 110 are suspended within the interior 32 and rapidly revolve about the tine shaft 106 when the tine shaft 106 rotates. The tines, or spoons 110 in this case, perforate and puncture the underlying ground surface G.

In operation, the electric power lawn aerator 10 has a two-step safety starting procedure. First, the operator actuates the main switch 66 by pressing it. The electric motor 54 is thus activated. When activated, the shaft 70 of the electric motor 54 spins. Because the idler pulley wheel 90 is normally set in its first position, rotational drive is not transferred to the second pulley wheel 88. Consequently, the driven wheel 22 and tine assembly 24 remain static and lack rotation and revolving in this instance. Second, in order to cause rotation of the driven wheel 22 and tine assembly 24, the operator pulls the bail control bar 40 to its pulled position. The bail cable 42 in turn pulls the idler pulley wheel 90 to the second position. Slack in the belt 92 is taken up by the idler pulley wheel 90, and rotational drive is transferred to the second pulley wheel 88. The driven wheel 22 and tine assembly 24 now rotate and the spoons 110 revolve. These steps, first and second, when performed in succession serve to initiate rotation of the driven wheel 22 and tine assembly 24.

It is to be understood that the foregoing is a description of one or more aspects of the disclosure. The disclosure is not limited to the particular embodiment(s) disclosed herein, but rather is defined solely by the claims below. Furthermore, the statements contained in the foregoing description relate to particular embodiments and are not to be construed as limitations on the scope of the disclosure or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. An electric power lawn aerator, comprising:
   a frame assembly;
   at least one non-driven wheel extending from said frame assembly;
   a handle assembly extending from said frame assembly;
   a powerhead assembly supported on said frame assembly, said powerhead assembly having at least one battery cavity for reception of at least one battery, said powerhead assembly having an electric motor powerable by the at least one battery, said electric motor having a shaft, said powerhead assembly has a housing, said at least one battery cavity is housed in said housing and said electric motor is housed in said housing, said at least one battery cavity and said electric motor exhibit a vertically-stacked configuration at said housing, said housing has an upper section and a lower section, said lower section spanning from said frame assembly and said upper section spanning from said lower section, said at least one battery cavity residing at said upper section and said electric motor residing at said lower section;
   a powertrain assembly receiving rotational drive input from said shaft of said electric motor upon activation of said electric motor, said powertrain assembly including a pulley assembly and a sprocket assembly, said pulley assembly including a plurality of pulley wheels, said sprocket assembly including a plurality of sprockets;
   a driven wheel extending from said frame assembly and receiving rotational drive input from said powertrain assembly;
   a tine assembly housed by said frame assembly and receiving rotational drive input from said powertrain assembly; and
   a main switch that activates said electric motor upon actuation and that deactivates said electric motor upon de-actuation, said main switch constituting an ON/OFF switch for said electric motor, said main switch disposed on an exterior of said housing of said powerhead assembly and is accessible by an operator at the exterior of said housing, said main switch residing at said upper section of said housing, said main switch having a cover that seals said main switch against external liquid.

2. The electric power lawn aerator as set forth in claim 1, further comprising an electronic control unit in electrical communication with said electric motor.

3. The electric power lawn aerator as set forth in claim 2, further comprising a speed controller in electrical communication with said electronic control unit, said speed controller managing speed of said shaft of said electric motor.

4. The electric power lawn aerator as set forth in claim 1, further comprising a bail control bar, wherein, in order to activate said electric motor and impart rotational drive input to said tine assembly, said main switch is actuated and said bail control bar is pulled.

5. The electric power lawn aerator as set forth in claim 4, wherein said bail control bar is connected to an idler pulley wheel of said plurality of pulley wheels via a bail cable, and, when said bail control bar is pulled, said idler pulley wheel engages a belt of said pulley assembly and draws the belt taut.

6. The electric power lawn aerator as set forth in claim 1, wherein said main switch electrically communicates with an electronic control unit of the electric power lawn aerator, the electronic control unit being in electrical communication with said electric motor.

7. The electric power lawn aerator as set forth in claim 1, wherein said at least one battery cavity is a first battery cavity and a second battery cavity, and further comprising a first battery received in said first battery cavity and a second battery received in said second battery cavity.

8. The electric power lawn aerator as set forth in claim 7, wherein said first battery is a first lithium-ion battery and said second battery is a second lithium-ion battery.

9. The electric power lawn aerator as set forth in claim 1, wherein said cover is provided over said main switch and fully seals said main switch and provides waterproof protection to said main switch.

10. The electric power lawn aerator as set forth in claim 9, wherein said cover is flexible and pressable by the user of the electric power lawn aerator.

11. An electric power lawn aerator, comprising:
a frame assembly;
at least one non-driven wheel situated at said frame assembly;
a handle assembly extending from said frame assembly;
a bail control bar situated at said handle assembly;
a powerhead assembly supported on said frame assembly, said powerhead assembly including a housing, at least one battery cavity, and an electric motor, said at least one battery cavity housed in said housing, said electric motor housed in said housing, said electric motor having a shaft, wherein said housing has an upper section and a lower section, said lower section spanning from said frame assembly and said upper section spanning from said lower section, said at least one battery cavity residing at said upper section and said electric motor residing at said lower section;
a main switch disposed adjacent said powerhead assembly, wherein said main switch is disposed on an exterior of said housing of said powerhead assembly and resides at said upper section of said housing, said main switch serving as an ON/OFF switch for said electric motor;
a powertrain assembly receiving rotational drive input from said shaft of said electric motor upon activation of said electric motor;
a tine assembly housed by said frame assembly and receiving rotational drive input from said powertrain assembly;
an electronic control unit in electrical communication with said main switch and in electrical communication with said electric motor; and
a cover provided over said main switch and fully seals said main switch and provides waterproof protection to said main switch, said cover being flexible and pressable by the user of the electric power lawn aerator for pressability of said main switch;
wherein, in order to activate said electric motor and impart rotational drive to said powertrain assembly and said tine assembly, said main switch is actuated and said bail control bar is brought to a pulled position, wherein activation of said electric motor occurs upon actuation of said main switch and bringing said bail control bar to said pulled position in succession.

* * * * *